(12) United States Patent
Birman et al.

(10) Patent No.: US 11,226,216 B2
(45) Date of Patent: Jan. 18, 2022

(54) SELF ADJUSTING RETENTION FEATURE FOR APPLIQUE ASSEMBLY

(71) Applicants: Vyacheslav Birman, Auburn Hills, MI (US); Matthew Sherman, Lake Orion, MI (US); Curt Ollila, Fenton, MI (US)

(72) Inventors: Vyacheslav Birman, Auburn Hills, MI (US); Matthew Sherman, Lake Orion, MI (US); Curt Ollila, Fenton, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 945 days.

(21) Appl. No.: 15/957,328

(22) Filed: Apr. 19, 2018

(65) Prior Publication Data

US 2019/0323867 A1  Oct. 24, 2019

(51) Int. Cl.
- *G01D 13/20* (2006.01)
- *G01D 7/00* (2006.01)
- *B60K 37/02* (2006.01)

(52) U.S. Cl.
CPC ............... *G01D 13/20* (2013.01); *G01D 7/00* (2013.01); *B60K 37/02* (2013.01); *B60K 2370/33* (2019.05); *B60K 2370/695* (2019.05)

(58) Field of Classification Search
CPC .......... G01D 13/20; G01D 7/00; G01D 13/18; G01D 11/28; B60K 2370/33; B60K 2370/695; B60K 37/02; B60K 2370/336; B60K 2370/6992
See application file for complete search history.

(56) References Cited

U.S. PATENT DOCUMENTS

| | | | | |
|---|---|---|---|---|
| 7,374,323 B1* | 5/2008 | Kelman | ............... | G01D 11/28 116/286 |
| 7,431,484 B2* | 10/2008 | Fong | .................... | B60K 37/02 362/23.01 |
| 8,826,846 B2* | 9/2014 | Hori | ..................... | G01D 11/28 116/286 |
| 9,140,589 B2* | 9/2015 | Bravo | ................. | G01D 13/265 |
| 9,316,511 B2* | 4/2016 | Mochizuki | ........... | G01D 13/04 |
| 9,664,541 B2* | 5/2017 | Otani | ................... | G02B 5/0226 |
| 9,688,191 B2* | 6/2017 | Bravo Solis | ........... | B60Q 3/10 |
| 9,829,371 B2* | 11/2017 | Otani | .................... | G01G 23/32 |
| 9,916,948 B2* | 3/2018 | Brudzynsky | ........ | H01H 23/025 |
| 10,031,277 B2* | 7/2018 | Birman | ................. | B60K 37/02 |
| 10,260,917 B2* | 4/2019 | Otani | ................... | G01D 13/28 |
| 10,576,883 B2* | 3/2020 | Birman | ................. | G01D 13/16 |
| 10,596,905 B2* | 3/2020 | Van Laack | ............ | G01D 13/12 |
| 10,983,482 B2* | 4/2021 | Koh | ........................ | G04G 9/10 |
| 2014/0261153 A1* | 9/2014 | Mochizuki | ........... | G01D 13/04 116/28 R |
| 2016/0091346 A1* | 3/2016 | Otani | ................... | G02B 5/0226 362/23.16 |
| 2017/0190083 A1* | 7/2017 | Zhou | ...................... | B29C 45/14 |
| 2019/0337448 A1* | 11/2019 | Birman | ................. | G01D 11/28 |
| 2019/0375293 A1* | 12/2019 | Birman | ................. | B60K 35/00 |
| 2021/0141140 A1* | 5/2021 | Birman | ............... | G02B 6/0068 |

* cited by examiner

*Primary Examiner* — Nimeshkumar D Patel
*Assistant Examiner* — Tania Courson

(57) ABSTRACT

A gauge assembly includes a dial face with a scale indicative of a vehicle operating parameter. The dial face includes an opening proximate the scale and an illuminable tick mark that extends through the opening in the dial face with the tick mark being larger than the opening.

15 Claims, 4 Drawing Sheets

SELF ADJUSTING RETENTION FEATURE FOR APPLIQUE ASSEMBLY

TECHNICAL FIELD

The present disclosure relates to dial gauges for vehicle instrument panels and clusters, and more specifically to a dial gauge with features for positioning a tick mark.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. Some gauges include illuminated indicators referred to as tick marks provided at specific increments relative to the reference numerals. The tick marks are part of a light guide disposed under the gauge face. The dial face includes openings through which the tick marks extend. The openings are larger than the tick marks to facilitate assembly. The larger openings may enable misalignment or light leakage around the tick marks that can detract from the perception of quality.

Automotive original equipment suppliers continually strive to improve quality, reduce costs and maintain customer interest with new produces and aesthetic design features.

SUMMARY

A featured gauge assembly embodiment includes a dial face including a scale indicative of vehicle operating parameter, the dial face including an opening proximate the scale and an illuminable tick mark extending through the opening in the dial face, wherein the tick mark is larger than the opening.

In a further embodiment of the forgoing gauge assembly, the opening includes a corner width across at each end of the opening and a central portion having a central width that is smaller than the corner width.

In a further embodiment of any of the forgoing gauge assemblies, the corner width is greater than a thickness of the tick mark.

In a further embodiment of any of the forgoing gauge assemblies, the opening includes side lengths and a middle length with the middle length being less than the side lengths.

In a further embodiment of any of the forgoing gauge assemblies, the tick mark includes a longitudinal length that is less than the middle length of the opening.

In a further embodiment of any of the forgoing gauge assemblies, including a plurality of tick marks spaced apart and extending through a corresponding plurality of openings.

In a further embodiment of any of the forgoing gauge assemblies, the opening comprises a perimeter having curved sides and curved ends.

In a further embodiment of any of the forgoing gauge assemblies, the opening includes four concave sides.

In a further embodiment of any of the forgoing gauge assemblies, including a light guide and each of the tick marks extend from the light guide.

In a further embodiment of any of the forgoing gauge assemblies, the tick marks are an integral portion of the light guide.

In a further embodiment of any of the forgoing gauge assemblies, the tick marks are an integral portion of the light guide.

In another disclosed embodiment a method of assembling a gauge assembly includes forming a dial face to include a scale indicative of an operating parameter and openings relative to the scale and inserting a corresponding plurality of tick marks through each of the openings such that a portion of each tick mark is visible on the dial face. The openings are smaller than corresponding ones of the plurality of tick marks to form an interference fit between the tick mark and the opening.

In a further embodiment of the foregoing method of assembling a gauge assembly, the dial face is formed of a flexible material and sides of the opening bend upward responsive to receiving one of the plurality of tick marks.

In a further embodiment of the foregoing method of assembling a gauge assembly, the opening comprises four concave sides and the tick mark bends the four concave sides outward when inserted through the dial face.

In a further embodiment of the foregoing method of assembling a gauge assembly, the four concave sides press against surfaces of the tick mark.

In a further embodiment of the foregoing method of assembling a gauge assembly, the plurality of tick marks are part of a light guide and inserting the tick marks into the openings aligns the tick marks and light guide relative the dial face.

In a further embodiment of the foregoing method of assembling a gauge assembly, a light source is supported relative to the light guide to illuminate the tick marks.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
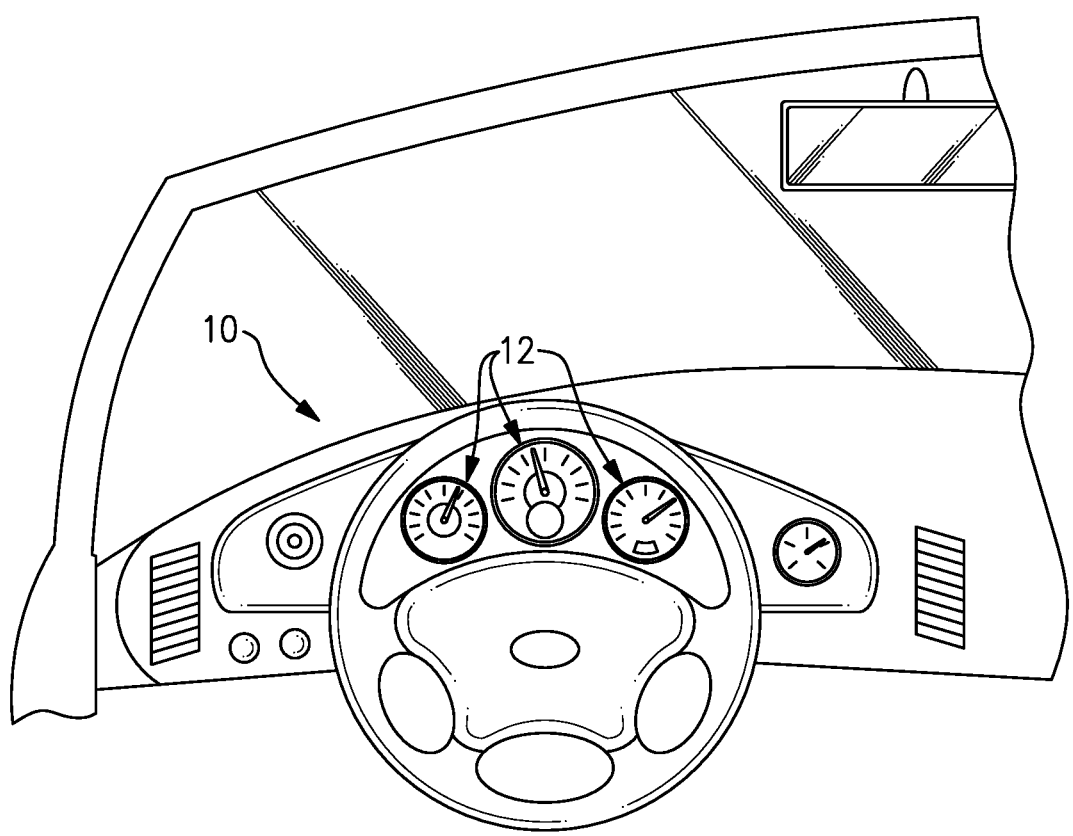
FIG. 1 is a schematic view of an example instrument panel.

Referring to FIG. 1, a vehicle includes an instrument panel 10 that includes a plurality of gauge assemblies 12. The gauge assemblies 12 each include a scale related to a vehicle operating parameter. A pointer moves relative to the scale to communicate the current value of the vehicle operating parameter. Each of the gauge assemblies includes features that communicate operating parameters and also include aesthetic features that enhance the look and feel of the instrument panel.

Figure 2:
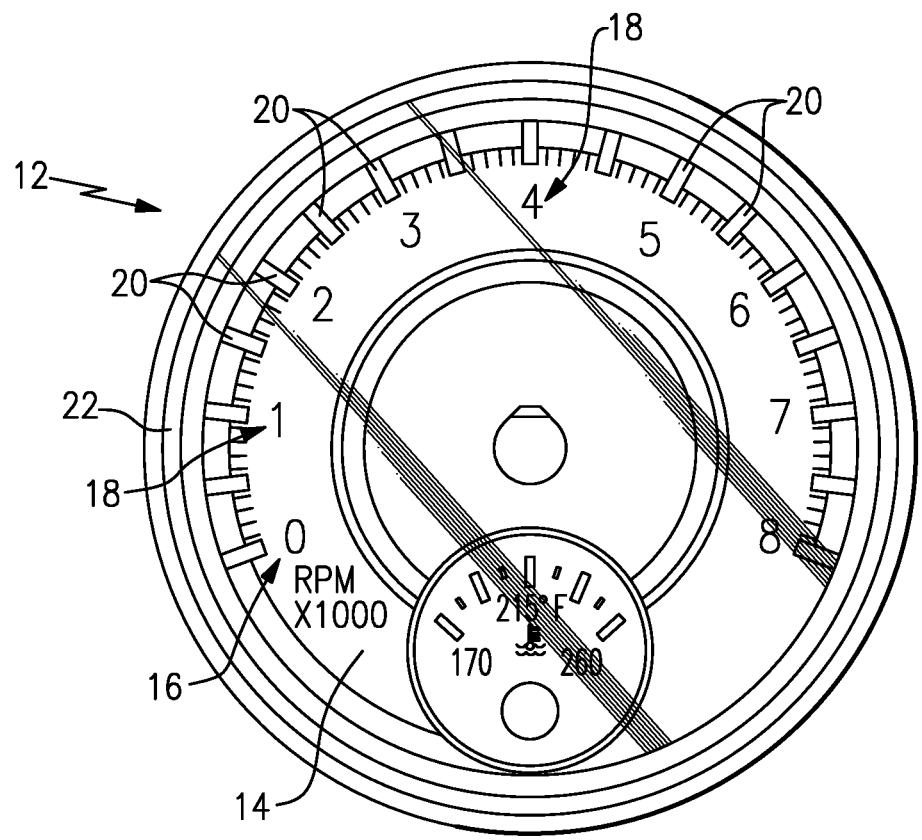
FIG. 2 is a front view of an example gauge assembly.

Referring to FIG. 2 with continued reference to FIG. 1, one of the example gauge assemblies 12 is shown and includes a dial face 14 with a scale 16 indicative of a vehicle operating parameter. In this example, the vehicle operating parameter is engine RPM. The scale 16 includes numerals 18 disposed about a center region. A pointer, not shown here for clarity, would be disposed in the center region and point to a current operating parameter. Tick marks 20 are provided and correspond with the numerals 18 and scale 16. The tick marks 20 provide a desired aesthetic appearance, aid in communicating a current value on the scale 16 and are also illuminable to further enhance visibility during operation of the vehicle.

Figure 3:
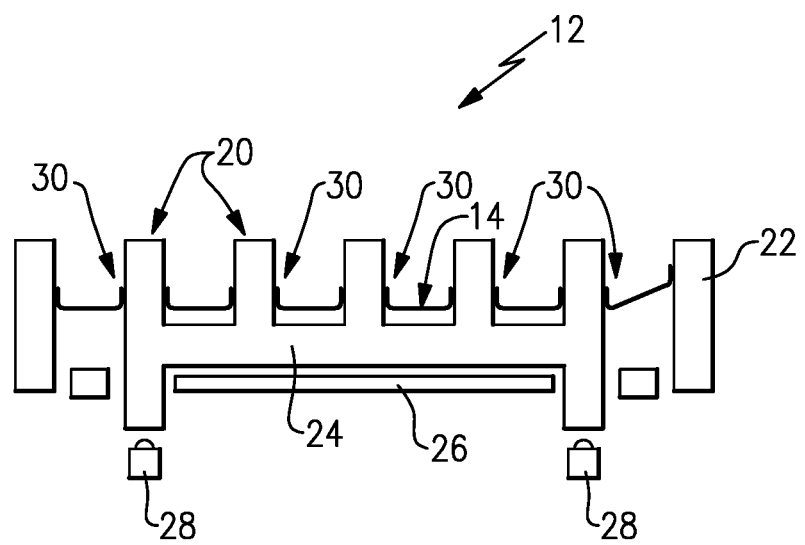
FIG. 3 is a cross-sectional view of an example gauge assembly.

Referring to FIG. 3 with continued reference to FIG. 2, the example dial gauge 12 is shown in a schematic cross-section and shows openings 30 for the tick marks 20 in the dial face 14. The tick marks 20 are part of a light guide 24 and extend through the dial face 14 at the corresponding opening 30. A light housing 26 is provided proximate the light guide 24 to contain light from light sources 28. The light sources 28 transmit light into the light guide 24 that then directs light into each of the illuminable tick marks 20.

The openings 30 in the dial face 14 are smaller than the size of the tick marks 20 to provide an interference fit between the dial face 14 and each of the tick marks 20. The interference fit between the tick marks 20 and the openings 30 prevent leakage of light through potential gaps that may exist between the tick marks 20 and the openings 30. Openings that are larger than the tick marks 20 to provide a clearance fit allow misalignment and light leakage. The disclosed gauge 12 substantially prevents light leakage and provides alignment for the tick marks 20 with the disclosed interference fit.

Figure 4:
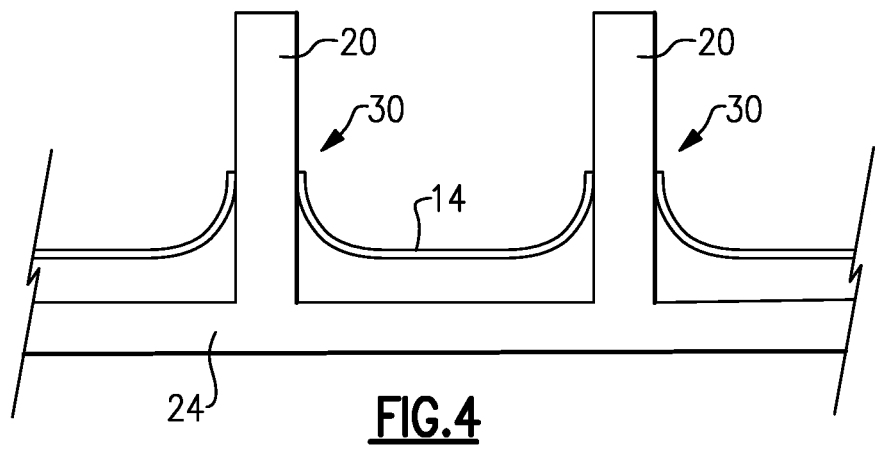
FIG. 4 is a cross-section of a portion of a dial face.
Figure 5:
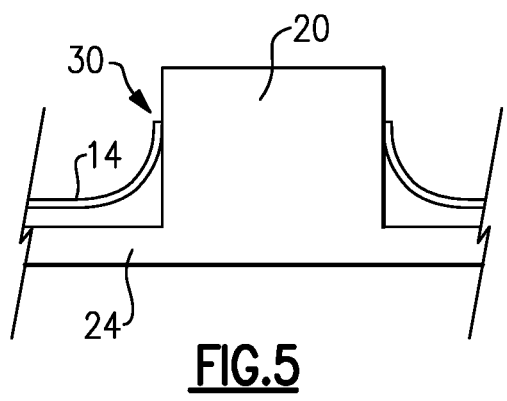
FIG. 5 is a cross-sectional view of another portion of a dial face.

Referring to FIGS. 4 and 5 with continued reference to FIG. 3, the tick marks 20 extend through the dial face 14 at the openings 30. The dial face 14 is formed from a flexible material such that portions of the dial face 14 surrounding the openings 30 bend upwardly to accept the corresponding tick mark 20. The tick marks 20 are shown in an end view in FIG. 4 and a side view in FIG. 5.

Figure 6:
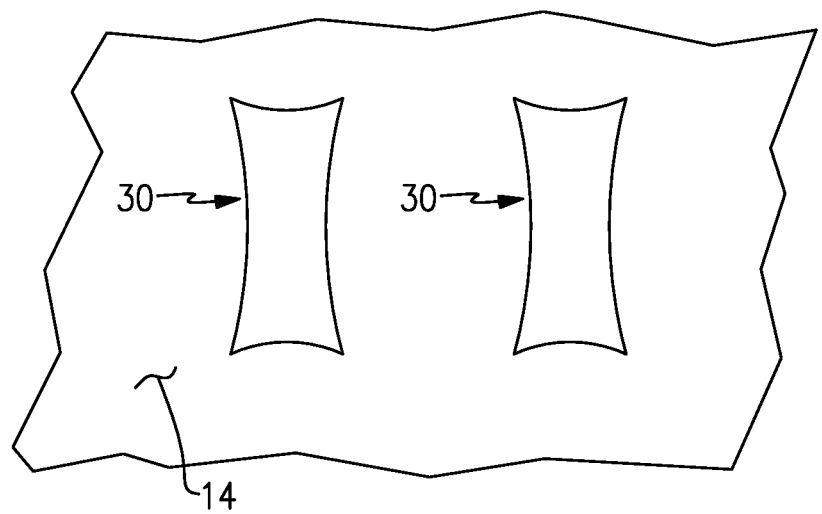
FIG. 6 is an enlarged view of a portion of the dial face.

Referring to FIG. 6 with continued reference to FIGS. 4 and 5, each of the openings 30 is in the forms a rectangle with concave sides. The concave sides are pushed upward against the sides of the tick marks 20 as is shown in FIGS. 4 and 5. The flexible structure of the dial face 14 enables portions to bend outwardly into abutment against sides of the tick marks 20.

Figure 7:
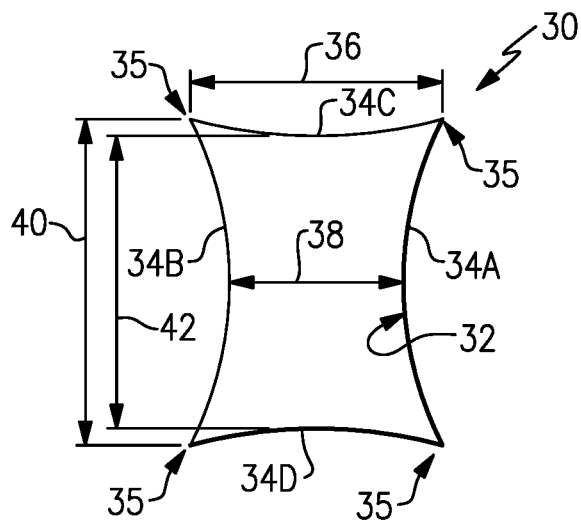
FIG. 7 is an enlarged view of an opening in the dial face.
Figure 8:
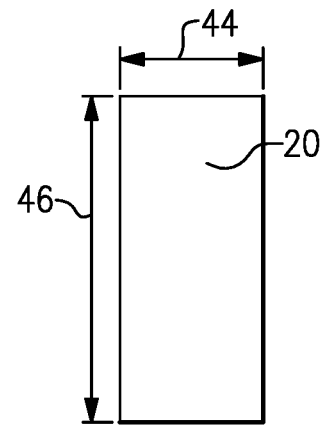
FIG. 8 is a top view of an example tick mark.
Figure 9:
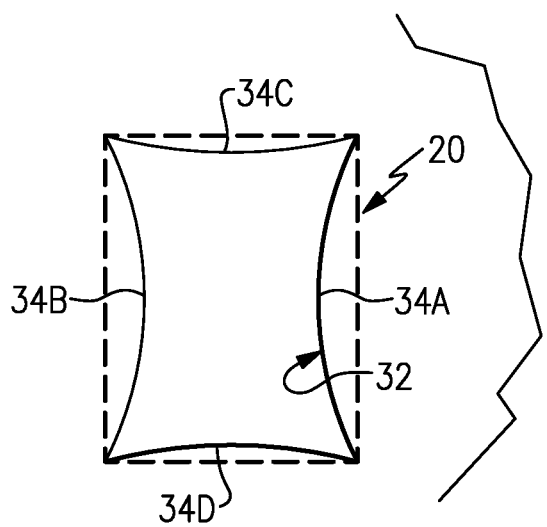
FIG. 9 is a schematic view of a fit of a tick mark within an example opening.

Referring to FIGS. 7, 8, and 9, each of the example openings 30 include an inner perimeter 32. The inner perimeter 32 includes concave side walls 34 A-D. Each of the side walls 34 A-D curve inwardly from corner portions 35. The concave sides 34A-D bend inwardly from the corners 35 to provide the interference fit with the tick mark 20.

In this example, each of the openings 30 include a first width 36 at the corners 35, and a second width 38 near a middle portion of the opening 30. The middle second width 38 is less than the end first width 36. Similarly, a length 40 from each of the corners 35 in a longitudinal direction is longer than a length 42 between surfaces 34c and 34d that is midway between the corners 35. The concave walls 34c and 34d thereby provide the interference fit with the corresponding tick mark 20 at the end surfaces.

It should be understood that although a rectangular opening 30 and tick mark 20 are disclosed by way of example, other rectilinear shapes would are within the contemplation of this disclosure. Moreover, other shapes including round, oval, elliptical or other shapes of openings that correspond to the shape of the tick mark are also within the contemplation and scope of this disclosure.

Referring to FIG. 8 with continued reference to FIG. 7, the example disclosed tick mark 20 includes a thickness 44 and a length 46. The thickness 44 is less than the width 38, provided in the opening 30. The length 46 is less than the length 42 provided by the opening 30. The difference between the thickness 44, width 38, length 46 and length 42 provide the interference fit with the opening 30 in the dial face 14.

Referring to FIG. 9 with continued reference to FIGS. 7 and 8, a schematic illustration of the fit between the tick marks 20 is shown with the dash lines indicating the outline of the tick mark 20. The opening 30 includes the concave walls 34A-D that will bend upwardly to accept the larger tick marks 20. By bending upwardly the walls 34 A-D come in intimate contact with each tick mark 20 to prevent light leakage and align the tick mark 20. The extent of the interference fit is determined by the difference in size between the tick mark 20 and the opening 30. The difference in size is determined to provide the desired fit without distorting the dial face 14.

Moreover, because the opening 30 is smaller than the tick marks 20, there is no movement between corresponding tick marks 20 once they are inserted through the dial face 14. The walls 34 A-D contact and center each tick mark 20, thus providing alignment of the tick marks 20, and thereby the light guide 24 relative to the dial face 14.

Figure 10:
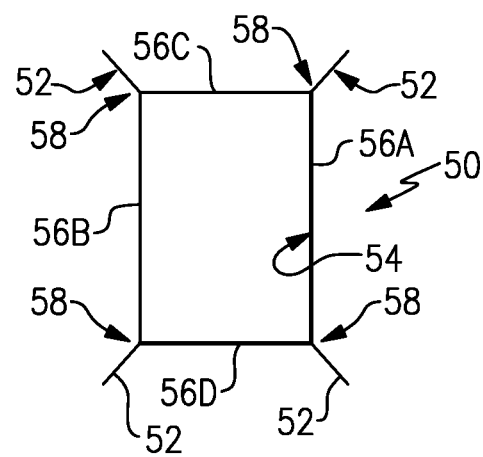
FIG. 10 is another example opening embodiment.

Referring to FIG. 10, another example opening 50 is illustrated that includes a rectangular inner perimeter 54 with side 56A-D and reliefs 52 disposed at each corner 58. The reliefs 52 enable bending of the sides 56A-D upon insertion of a corresponding tick mark 20.

Accordingly, the example dial face includes a plurality of opening that accept corresponding tick marks in a manner that self-aligns the light guide relative to the dial face and prevents leakage of any light through any potential gaps between a tick mark and the dial face.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly comprising:
a dial face including a scale indicative of vehicle operating parameter, the dial face including an opening proximate the scale;

an illuminable tick mark extending through the opening in the dial face, wherein the tick mark is larger than the opening; and wherein the opening includes a corner width across each end of the opening and a central portion having a central width that is smaller than the corner width.

2. The gauge assembly as recited in claim 1, wherein the corner width is greater than a thickness of the tick mark.

3. The gauge assembly as recited in claim 1, including a plurality of tick marks spaced apart and extending through a corresponding plurality of opening.

4. The gauge assembly as recited in claim 1, wherein the opening comprises a perimeter having curved sides and curved ends.

5. The gauge assembly as recited in claim 1, wherein the opening includes side lengths and a middle length with the middle length being less than the side lengths.

6. The gauge assembly as recited in claim 5, wherein the tick mark includes a longitudinal length that is less than the middle length of the opening.

7. The gauge assembly as recited in claim 1, wherein the opening includes four concave sides.

8. The gauge assembly as recited in claim 7, including a light guide and each of the tick marks extend from the light guide.

9. The gauge assembly as recited in claim 8, wherein the tick marks are integral portion of the light guide.

10. The gauge assembly as recited in claim 8, wherein the light guide is supported on a non-visible side of the dial face.

11. A method of assembling a gauge assembly comprising:

forming a dial face to include a scale indicative of an operating parameter and openings relative to the scale; and inserting a corresponding plurality of tick marks through each of the openings such that a portion of each tick mark is visible on the dial face, wherein each of the openings is smaller than the corresponding one of the plurality of tick marks to form an interference fit between the tick mark and the opening; and wherein the dial face is formed of a flexible material and sides of the opening bend upward responsive to receiving one of the plurality of tick marks.

12. The method as recited in claim 11, wherein the opening comprises four concave sides and the tick mark bends the four concave sides outward when inserted through the dial face.

13. The method as recited in claim 12, wherein the four concave sides press against surfaces of the tick mark.

14. The method as recited in claim 11, wherein the plurality of tick marks are part of a light guide and inserting the tick marks into the openings aligns the tick marks and light guide relative the dial face.

15. The method as recited in claim 14, including supporting a light source relative to the light guide to illuminate the tick marks.

* * * * *